United States Patent
Ishikawa

(10) Patent No.: US 11,673,340 B2
(45) Date of Patent: Jun. 13, 2023

(54) DIELECTRIC-HEATING BONDING FILM AND BONDING METHOD USING DIELECTRIC-HEATING BONDING FILM

(71) Applicant: LINTEC CORPORATION, Tokyo (JP)

(72) Inventor: Masakazu Ishikawa, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 849 days.

(21) Appl. No.: 16/345,155

(22) PCT Filed: Oct. 18, 2017

(86) PCT No.: PCT/JP2017/037617
§ 371 (c)(1),
(2) Date: Apr. 25, 2019

(87) PCT Pub. No.: WO2018/079355
PCT Pub. Date: May 3, 2018

(65) Prior Publication Data
US 2019/0329504 A1    Oct. 31, 2019

(30) Foreign Application Priority Data

Oct. 27, 2016  (JP) .............................. JP2016-210218
Feb. 9, 2017   (JP) .............................. JP2017-021803
Feb. 9, 2017   (JP) .............................. JP2017-021806

(51) Int. Cl.
*B29C 65/04*       (2006.01)
*B29C 65/42*       (2006.01)
(Continued)

(52) U.S. Cl.
CPC .............. *B29C 65/04* (2013.01); *B29C 65/40* (2013.01); *B29C 65/425* (2013.01); *B29C 65/50* (2013.01);
(Continued)

(58) Field of Classification Search
CPC ....... B29C 65/04; B29C 65/40; B29C 65/425; B29C 65/50; C08K 3/22; C08K 3/14;
(Continued)

(56) References Cited

U.S. PATENT DOCUMENTS 4,126,464 A    11/1978  Dann
9,617,399 B2 *  4/2017  Weaver ............... C08L 23/0815
(Continued)

FOREIGN PATENT DOCUMENTS

CN           1412265 A    4/2003
CN         102470492 A    5/2012
(Continued)

OTHER PUBLICATIONS

Accu Dyne Test, "Surface Free Energy Components by Polar/Dispersion and Acid—Base Analyses; and Hansen Solubility Parameters of Various Polymers", https://www.accudynetest.com/polytable_02.html#11 , accessed on Jan. 28, 2022 (Year: 2007).*
(Continued)

*Primary Examiner* — Jacob T Minskey
*Assistant Examiner* — Caroline Beha
(74) *Attorney, Agent, or Firm* — McDermott Will & Emery LLP

(57) ABSTRACT

A dielectric welding film capable of providing excellent adhesiveness to a variety of adherends in a short period of dielectric heating, and an welding method using the dielectric welding film are provided. The dielectric welding film is configured to adhere a pair of adherends of the same material or different materials through dielectric heating, the dielectric welding film including a first thermoplastic resin as an A1 component having a predetermined solubility parameter, a second thermoplastic resin as an A2 component having a solubility parameter larger than the solubility parameter of the first thermoplastic resin, and a dielectric filler as a B
(Continued)

component. The welding method uses the dielectric welding film.

14 Claims, 2 Drawing Sheets

(51) Int. Cl.
| | |
|---|---|
| B29C 65/50 | (2006.01) |
| C09J 167/00 | (2006.01) |
| C09J 177/00 | (2006.01) |
| B29C 65/40 | (2006.01) |
| C08K 3/14 | (2006.01) |
| C08K 3/22 | (2006.01) |
| C09J 11/04 | (2006.01) |
| C09J 123/26 | (2006.01) |
| C09J 129/14 | (2006.01) |
| C09J 131/04 | (2006.01) |
| H05B 6/46 | (2006.01) |
| C09J 123/00 | (2006.01) |
| C09J 125/04 | (2006.01) |
| H05B 6/64 | (2006.01) |
| C09J 7/00 | (2018.01) |
| C09J 201/00 | (2006.01) |
| C09J 123/10 | (2006.01) |
| C09J 7/35 | (2018.01) |
| C09J 5/06 | (2006.01) |
| C09J 9/00 | (2006.01) |
| H01B 3/44 | (2006.01) |
| H01B 17/56 | (2006.01) |
| H05B 6/50 | (2006.01) |

(52) U.S. Cl.
CPC .............. *C08K 3/22* (2013.01); *C09J 5/06* (2013.01); *C09J 7/00* (2013.01); *C09J 7/35* (2018.01); *C09J 9/00* (2013.01); *C09J 11/04* (2013.01); *C09J 123/00* (2013.01); *C09J 123/10* (2013.01); *C09J 123/26* (2013.01); *C09J 125/04* (2013.01); *C09J 129/14* (2013.01); *C09J 131/04* (2013.01); *C09J 167/00* (2013.01); *C09J 177/00* (2013.01); *C09J 201/00* (2013.01); *H01B 3/441* (2013.01); *H01B 17/56* (2013.01); *H05B 6/46* (2013.01); *H05B 6/50* (2013.01); *H05B 6/64* (2013.01); *C08K 3/14* (2013.01); *C08K 2003/2296* (2013.01); *C08K 2201/005* (2013.01); *C09J 2203/326* (2013.01); *C09J 2301/408* (2020.08); *C09J 2301/416* (2020.08); *C09J 2423/10* (2013.01)

(58) Field of Classification Search
CPC ...... C08K 2003/2296; C08K 2201/005; C08K 2003/2237; C09J 5/06; C09J 7/00; C09J 7/35; C09J 9/00; C09J 11/04; C09J 123/00; C09J 123/10; C09J 123/26; C09J 125/04; C09J 129/14; C09J 131/04; C09J 167/00; C09J 177/00; C09J 201/00; C09J 2203/326; C09J 2301/408; C09J 2301/416; C09J 2423/10; C09J 2301/312; C09J 2301/304; C09J 2423/00; C09J 2423/106; C09J 2451/00; C09J 2467/00; C09J 7/10; C09J 123/12; H01B 3/441; H01B 17/56; H05B 6/46; H05B 6/50; H05B 6/64; B23K 13/00
See application file for complete search history.

(56) References Cited

U.S. PATENT DOCUMENTS

| | | | |
|---|---|---|---|
| 2005/0106967 A1* | 5/2005 | Suzuki | B32B 27/308 442/87 |
| 2007/0084550 A1* | 4/2007 | Epstein | B29C 66/5344 156/272.8 |
| 2016/0145421 A1* | 5/2016 | Wilhelm | B01J 13/04 523/137 |
| 2018/0141307 A1* | 5/2018 | Yoshida | B32B 27/30 |

FOREIGN PATENT DOCUMENTS

| | | |
|---|---|---|
| CN | 104136197 A | 11/2014 |
| EP | 2029664 A2 | 3/2009 |
| EP | 2794237 A1 | 10/2014 |
| EP | 3608380 A1 | 2/2020 |
| JP | S51-126228 A | 11/1976 |
| JP | S52-068273 A | 6/1977 |
| JP | S54-004933 A | 1/1979 |
| JP | S54-161645 A | 12/1979 |
| JP | S56-055474 A | 5/1981 |
| JP | S58-174474 A | 10/1983 |
| JP | S61-171783 A | 8/1986 |
| JP | S62-039221 A | 2/1987 |
| JP | H01-294393 A | 11/1989 |
| JP | H04-15282 A | 1/1992 |
| JP | H08-048824 A | 2/1996 |
| JP | H08-072055 A | 3/1996 |
| JP | H08-258173 A | 10/1996 |
| JP | H11-157398 A | 6/1999 |
| JP | 2000-289113 A | 10/2000 |
| JP | 2001-146524 A | 5/2001 |
| JP | 2001-172413 A | 6/2001 |
| JP | 2001-226533 A | 8/2001 |
| JP | 2001-260231 A | 9/2001 |
| JP | 2003-193009 A | 7/2003 |
| JP | 2003-238745 A | 8/2003 |
| JP | 2004-181969 A | 7/2004 |
| JP | 2008-156510 A | 7/2008 |
| JP | 2009-538971 A | 11/2009 |
| JP | 2010-006908 A | 1/2010 |
| JP | 2014-037489 A | 2/2014 |
| JP | 2015-151493 A | 8/2015 |
| WO | 02/088229 A1 | 11/2002 |

OTHER PUBLICATIONS

International Preliminary Report on Patentability issued in corresponding International Patent Application No. PCT/JP2017/037617, dated Apr. 30, 2019.
European Search Report issued in corresponding European Patent Application No. 17864688.1, dated May 29, 2020.
Concise Handbook of Common Data for Rubber, first edition, Oct. 31, 2012, Chang Guanjun National Defense Industry Press, p. 116 (a concise explanation of the relevance of the Handbook is found in the Chinese Office Action (translation) at p. 3).
Chinese Office Action issued in corresponding Chinese Patent Application No. 201780066587.8, dated Nov. 30, 2020, with English translation.
Notice of Reason(s) for Rejection issued in corresponding Japanese Application No. 2018-547589, dated Jul. 23, 2019, with English translation.
International Search Report issued in corresponding International Patent Application No. PCT/JP2017/037617, dated Dec. 5, 2017, with English Translation.
Carvalho Suzanny P. et al., "Determining Hildebrand Solubility Parameter by Ultraviolet Spectroscopy and Microcalorimetry," Journal of the Brazilian chemical society, Jan. 1, 2013 (Jan. 1, 2013), XP093029434, Sao Paulo, BRISSN: 0103-5053, DOI: 10.5935/0103-5053.20130250.

(56) References Cited

OTHER PUBLICATIONS

European Office Action issued for the corresponding European Patent Application No. 17864688.1 dated Mar. 13, 2023.

* cited by examiner

400μm ELECTRON MICROSCOPIC IMAGE

400μm ELECTRON MICROSCOPIC IMAGE

DIELECTRIC-HEATING BONDING FILM AND BONDING METHOD USING DIELECTRIC-HEATING BONDING FILM

CROSS REFERENCE

This application is the U.S. National Phase under 35 U.S.C. § 371 of International Application No. PCT/JP2017/037617, filed on Oct. 18, 2017, which claims the benefit of Japanese Patent Application No. 2016-210218, filed Oct. 27, 2016, Japanese Patent Application No. 2017-021803, filed Feb. 9, 2017 and Japanese Patent Application No. 2017-021806, filed Feb. 9, 2017, the entire contents of each are hereby incorporated by reference.

TECHNICAL FIELD

The present invention relates to a dielectric welding film, and an welding method using the dielectric welding film.

Specifically, the present invention relates to a dielectric welding film, which is usable for adherends of different types and is capable of providing large adhesivity in a relatively short period of dielectric heating (sometimes referred to as high-frequency dielectric heating hereinafter), and an welding method (sometimes referred to as bonding method hereinafter) using the dielectric welding film.

BACKGROUND ART

In order to weld a plurality of typically hard-to-bond adherends (i.e. difficult to be bonded), it has been recently proposed that, for instance, a welding process such as dielectric heating, induction heating, ultrasonic welding or laser welding is performed with an adhesive produced by blending a heat-generating material in a predetermined resin.

According to a proposed welding method by dielectric heating among the above, an adhesive blended with carbon black (CB), silicon carbide (SiC), or the like is interposed between a plurality of adherends and dielectric heating at a frequency of 28 or 40 MHz or microwave heating is applied to weld the plurality of adherends (see Patent Literatures 1 and 2).

According to another proposed welding method by the dielectric heating, polyolefin resin is blended with a ferroelectric material and a carbon compound, a conductive material or the like to prepare an adhesive with a dissipation factor (tan δ) of 0.03 or more, and the adhesive is interposed between a plurality of adherends to adhere the adherends through dielectric heating at a frequency of 40 MHz (see Patent Literatures 3 and 4).

According to still another proposed related art, an adhesive composition for dielectric heating is produced by adding a dielectric heating medium to an adhesive compatible with a plurality of adherends (base materials) to be bonded. The adhesion layer composition for dielectric heating satisfies a formula: $C \times \{(\tan \delta)/\varepsilon'\}^{1/2} \geq d$, where $\varepsilon'$ represents specific permittivity, tan δ represents a dissipation factor, d (mm) represents a total thickness of the base materials to be bonded, and the coefficient C is in a range from 78 to 85 (see Patent Literature 5).

CITATION LIST

Patent Literature(s)

Patent Literature 1 JP 2010-6908 A (claims etc.)
Patent Literature 2 JP 2008-156510 A (claims etc.)
Patent Literature 3 JP 2003-238745 A (claims etc.)
Patent Literature 4 JP 2003-193009 A (claims etc.)
Patent Literature 5 JP 2014-37489 A (claims etc.)

SUMMARY OF THE INVENTION

Problem(s) to be Solved by the Invention

However, the dielectric heating process disclosed in Patent Literature 1 or 2, in which a considerable amount of the conductive material such as carbon black (CB) is blended in the adhesive to form the adhesion layer composition, is likely to cause electric breakdown during the dielectric heating to carbonize an adhered portion and/or the adherends.

In addition, vertical alignment of the adherends is difficult, since the color of the resultant adhesion layer composition is perfectly opaque black (visible light transmissivity: 0%).

Accordingly, it is difficult to apply the dielectric heating at an accurate position or adhere correct portions.

The dielectric heating disclosed in Patent Literature 3 or 4 is also likely to cause electric breakdown during the dielectric heating process due to the considerable amount of the conductive material (e.g. metal or carbide compound) added in the adhesive resin composition.

In addition, vertical alignment of the plurality of adherends is difficult due to the perfect opacity of the resultant adhesion resin composition (visible light transmissivity: 0%).

Accordingly, it is difficult to apply the dielectric heating at an accurate position.

The use of the adhesion layer composition for dielectric heating disclosed in Patent Literature 5 often excessively limits the type of usable adherend, whose adhesiveness is affected by a total thickness of base materials to be adhered.

In addition, in order to ensure sufficient adhesion strength, dielectric heating has to be applied for at least 40 to 70 seconds, which is considerably long in terms of practical use and thus is economically disadvantageous.

Moreover, none of Patent Literatures 1 to 5 discloses or suggests that the adhesion layer composition for dielectric heating contains a plurality of thermoplastic resins of different solubility parameters for adhesive components.

Still more, it has not been found that, with the use of a plurality of thermoplastic resins of different solubility parameters, a single dielectric welding film is applicable to wide variety of adherends and sufficient adhesion strength can be obtained even in a short period of dielectric heating.

In view of the above, after dedicated studies on the problems associated with the related arts, the inventors are going to provide a predetermined dielectric welding film containing a plurality of thermoplastic resins with different solubility parameters as the adhesive component capable of adhering a wide variety of adherends with excellent adhesiveness through dielectric heating of, for instance, less than 40 seconds, and an welding method using the dielectric welding film (sometimes simply referred to as welding method, hereinafter).

Means for Solving the Problems

A dielectric welding film according to an aspect of the invention is configured to weld a pair of adherends of the same material or different materials though dielectric heating, the dielectric welding film including: a first thermoplastic resin as an A1 component having a predetermined first solubility parameter (δ1); a second thermoplastic resin as an A2 component, the second thermoplastic resin having a second solubility parameter (δ2) larger than the first solubility parameter of the first thermoplastic resin; and a dielectric filler as a B component. The dielectric welding film thus can solve the above-described problems.

The dielectric welding film according to the above aspect of the invention at least including the A1, A2 and B components provides excellent adhesiveness to adherends of different types through dielectric heating of, for instance, less than 40 seconds.

Further, the storage modulus (E') of the dielectric welding film can be easily controlled, so that handleability and flexibility of the dielectric welding film can be improved.

Thus, the dielectric welding film can be easily wound into an elongated roll of, for instance, 10 m or more, and can be easily applied to a roll-to-roll process.

In the dielectric welding film according to the above aspect of the invention, it is preferable that a difference (δ2−δ1) between the second solubility parameter (δ2) of the A2 component and the first solubility parameter (δ1) of the A1 component is 0.5 $(J/(cm3))^{1/2}$ or more.

The dielectric welding film containing the A1 component and the A2 component having different solubility parameters as the adhesive component provides balanced adhesiveness to adherends having different polarities.

In the dielectric welding film according to the above aspect of the invention, it is preferable that the first solubility parameter (δ1) of the A1 component is 12 $(J/(cm^3))^{1/2}$ or more and less than 19.5 $(J/(cm^3))^{1/2}$, and the second solubility parameter (δ2) of the A2 component is in a range from 19.5 $(J/(cm^3))^{1/2}$ to 31.5 $(J/(cm^3))^{1/2}$.

The above solubility parameters (δ1 and δ2) of the adhesive components (the first thermoplastic resin and the second thermoplastic resin) result in improvement in compatibility between the A1 and A2 components, allowing uniform handleability and properties of the dielectric welding film.

The storage modulus (E') of the dielectric welding film containing the A1 and A2 components having the predetermined solubility parameters can thus be easily controlled, so that handleability of the dielectric welding film can be improved.

In addition, excellent balanced adhesiveness can be obtained through relatively short period of dielectric heating irrespective of the type of the adherends.

It should be noted that, when the A1 component is, for instance, a polypropylene resin, the solubility parameter (δ1) is usually in a range from 15.5 to 19.0 $(J/(cm^3))^{1/2}$. When the A2 component is a polyester resin, the solubility parameter (δ2) is usually in a range from 19.5 to 24 $(J/(cm^3))^{1/2}$.

In the dielectric welding film according to the above aspect of the invention, it is preferable that a content of the B component is in a range from 5 to 800 parts by mass with respect to 100 parts by mass of a total amount of the A1 component and the A2 component.

With the above blend ratio of the B component with respect to the total amount of the A1 and A2 components, the handleability of the dielectric welding film can be improved. Further, a dielectric heating time for providing favorable adhesiveness to a variety of adherends can be reduced to, for instance, less than 40 seconds.

In the dielectric welding film according to the above aspect of the invention, it is preferable that a blend ratio of the A1 component and the A2 component in parts by mass is in a range from 5:95 to 95:5.

By thus adjusting the blend ratio of the A1 and A2 components, the A1 component and the A2 component are more homogenized (i.e. uniformly blended). Further, excellent adhesiveness can be obtained for a wider variety of the materials of the adherends, so that the dielectric welding film is applicable to a variety of adherends having a so-called high-polarity or low-polarity surface.

In the dielectric welding film according to the above aspect of the invention, it is preferable that the A1 component is a polyolefin resin and the A2 component is a polyester resin.

When the A1 and A2 components are provided by a combination of specific resins, the melting point and/or softening point can be easily adjusted, and handleability of the dielectric welding film is improvable.

The combination of the specific resins provides excellent transparency and can achieve an excellent balance between heat resistance in, for instance, a use environment and weldability during the dielectric heating.

In the dielectric welding film according to the above aspect of the invention, it is preferable that the (B) component is zinc oxide.

The B component in a form of zinc oxide can exhibit a predetermined exothermic effect during the dielectric heating even when being blended in the adhesive component (the A1 and A2 components) in a relatively small amount.

In addition, zinc oxide can be uniformly dispersed in the adhesive component (the A1 and A2 components), so that the transparency of the dielectric welding film can be favorably balanced with the weldability during the dielectric heating.

In the dielectric welding film according to the above aspect of the invention, it is preferable that a mean particle size of the B component measured in accordance with JIS Z 8819-2 (2001) is in a range from 1 to 30 μm.

With the mean particle size of the B component controlled within the predetermined range, the B component can be uniformly dispersed in the adhesive component (the A1 and A2 components), so that the transparency of the dielectric welding film can be favorably balanced with the weldability during the dielectric heating.

A welding method according to another aspect of the invention uses a dielectric welding film configured to weld a pair of adherends of the same material or different materials though dielectric heating, the dielectric welding film including a first thermoplastic resin as an A1 component having a predetermined first solubility parameter (δ1) and a second thermoplastic resin as an A2 component having a second solubility parameter (δ2) larger than the first solubility parameter of the first thermoplastic resin, and a dielectric filler as a B component, the method including steps (1) and (2) of:

(1) holding the dielectric welding film between a pair of adherends; and (2) applying the dielectric heating on the dielectric welding film held between the pair of adherends with a dielectric heater at a high-frequency output ranging from 0.1 to 20 kW for a high-frequency wave application time of 1 second or more and less than 40 seconds.

The welding method according to the above aspect of the invention using the dielectric welding film provides excellent adhesiveness through dielectric heating in, for instance, less than 40 seconds irrespective of the type of the adherends.

BRIEF DESCRIPTION OF DRAWING(S)

DESCRIPTION OF EMBODIMENT(S)

First Exemplary Embodiment

Figure 1:
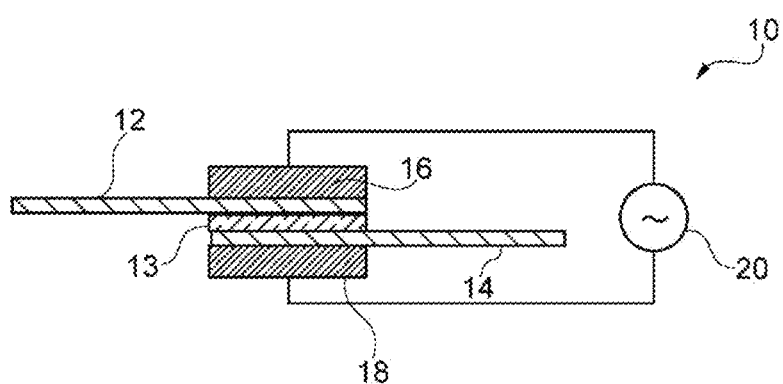
FIG. 1 illustrates dielectric heating performed with a dielectric heater.

A dielectric welding film according to a first exemplary embodiment is configured to bond adherends of the same material or different materials through dielectric heating, the dielectric welding film including an A1 component in a form of a first thermoplastic resin having a predetermined solubility parameter ($\delta 1$), an A2 component in a form of a second thermoplastic resin having a solubility parameter ($\delta 2$) larger than the solubility parameter of the first thermoplastic resin, and a B component in a form of a dielectric filler.

The components, properties and the like of the dielectric welding film according to the first exemplary embodiment will be specifically described below.

1 Components of Dielectric Welding Film (1) A1 Component (First Thermoplastic Resin)

Type

The type of the A1 component (first thermoplastic resin) as an adhesive component is not limited as long as the solubility parameter of the A1 component is smaller than the solubility parameter of below-described A2 component.

Examples of the A1 component include homopolymer resins such as polyethylene, polypropylene, polybutene and polymethylpentene, and α-olefin resins of copolymers of ethylene, propylene, butene, hexene, octene, 4-methylpentene and the like.

When a polyolefin resin is used as the A1 component, the polyolefin resin is preferably a polypropylene resin.

This is because a polypropylene resin allows easy adjustment of melting point or softening point and, consequently, can provide excellent mechanical strength and transparency and stable adhesion property.

It should be noted that permittivity ($\varepsilon/1$ MHz) of the polypropylene resin is typically in a range from 2.2 to 2.6, dielectric power factor (tan $\delta/1$ MHz) of the polypropylene resin is in a range from 0.0005 to 0.0018, and loss factor of the polypropylene resin is approximately 0.0047.

Solubility Parameter

The solubility parameter ($\delta 1$) of the first thermoplastic resin may be any value smaller than the solubility parameter ($\delta 2$) of the second thermoplastic resin. The first thermoplastic resin is preferably selected so that a difference ($\delta 2-\delta 1$) between the solubility parameter ($\delta 2$) of the second thermoplastic resin and the solubility parameter ($\delta 1$) of the first thermoplastic resin is 0.5 $(J/(cm^3))^{1/2}$ or more, more preferably so that the difference ($\delta 2-\delta 1$) is in a range from 1 to 10 $(J/(cm^3))^{1/2}$, further preferably so that the difference ($\delta 2-\delta 1$) is in a range from 2 to 8 $(J/(cm^3))^{1/2}$.

This is because, by controlling the solubility parameter ($\delta 1$) of the first thermoplastic resin in view of the difference ($\delta 2-\delta 1$) between the solubility parameters, excellent adhesiveness can be obtained for adherends bonded through the dielectric welding film containing the thermoplastic resins, even when one of the adherends includes a low-polarity surface and the other of the adherends includes a high-polarity surface.

In other words, failure in obtaining a predetermined adhesivity due to reduction in adhesiveness to a surface of only one of the adherends can be effectively prevented.

The solubility parameter ($\delta 1$) of the first thermoplastic resin is typically preferably 12 or more and less than 19.5 $(J/(cm^3))^{1/2}$.

The solubility parameter ($\delta 1$) within the above predetermined range provides excellent compatibility and high adhesion strength with an adherend containing a low-polarity material such as polypropylene resin.

Specifically, when the solubility parameter ($\delta 1$) is 12 $(J/(cm^3))^{1/2}$ or more, the first thermoplastic resin is homogenized with the second thermoplastic resin, so that mechanical strength of resultant dielectric welding film is improvable and sufficient processability can be often exhibited during the dielectric welding.

Further, the solubility parameter ($\delta 1$) of less than 19.5 $(J/(cm^3))^{1/2}$ allows a sufficiently wide selection of the usable second thermoplastic resins and can provide high adhesivity with a variety of adherends.

Accordingly, the solubility parameter ($\delta 1$) of the first thermoplastic resin is more preferably in a range from 13 to 19 $(J/(cm^3))^{1/2}$, further preferably in a range from 13.6 to 18 $(J/(cm^3))^{1/2}$.

Melting Point or Softening Point

The melting point or softening point of the first thermoplastic resin is preferably in a range from 80 to 200 degrees C.

Specifically, a crystalline first thermoplastic resin, whose melting point (i.e. a temperature at which a crystalline portion is melted) measured by a differential scanning calorimeter (DSC) or the like is defined within a predetermined range, can achieve a favorable balance between heat resistance in a use environment and the like and weldability during the dielectric heating.

More specifically, the melting point may be determined using a differential scanning calorimeter by: raising a temperature of 10 mg measurement sample (first thermoplastic resin) to 250 degrees C.; cooling the measurement sample to 25 degrees C. at a temperature-decrease rate of 10 degrees C./min to crystallize the measurement sample; again heating the measurement sample at a temperature-increase rate of 10 degrees C./min to re-melt the sample; and measuring a peak temperature of a melting peak observed on a DSC chart (fusion curve) when the sample is re-melted.

An amorphous first thermoplastic resin, whose softening point (glass transition point) (i.e. a temperature at which an amorphous portion is melted) measured in accordance with a ring-and-ball method or the like is defined within a predetermined range, can also achieve a favorable balance between heat resistance and weldability during the dielectric heating.

More specifically, the softening point of the first thermoplastic resin can be measured in accordance with JIS K 6863 (1994).

In either case, when the melting point or the softening point of the first thermoplastic resin falls below 80 degrees C., the heat resistance may become so insufficient that the applicable range may be excessively limited and/or mechanical strength may be significantly reduced.

Meanwhile, when the melting point or the softening point of the first thermoplastic resin exceeds 200 degrees C., welding through the dielectric heating may take an excessively long time and/or the adhesivity may be excessively decreased.

The melting point or the softening point of the first thermoplastic resin for the dielectric welding film of the first exemplary embodiment thus more preferably ranges from 100 to 190 degrees C., further preferably from 130 to 180 degrees C.

Average Molecular Weight

The average molecular weight (weight average molecular weight) of the first thermoplastic resin is usually preferably in a range from 5000 to 300000.

This is because, when the weight average molecular weight of the first thermoplastic resin falls below 5000, the heat resistance and/or the bonding strength may be significantly reduced.

Meanwhile, when the weight average molecular weight of the first thermoplastic resin exceeds 300000, the weldability and the like during the dielectric heating may be significantly reduced.

The weight average molecular weight of the first thermoplastic resin is thus more preferably in a range from 10000 to 200000, further preferably from 30000 to 100000.

It should be noted that the weight average molecular weight of the first thermoplastic resin can be measured through, for instance, intrinsic viscosity method in accordance with JIS K 7367-3 (1999).

Melt Flow Rate

Though depending on the weight average molecular weight, the melt flow rates (MFR) of the first thermoplastic resin and second thermoplastic resin (later-described) are each usually preferably in a range from 1 to 300 g/10 min at 230 degrees C. under 2.16 kg load.

When the MFR is 1 g/10 min or more, the heat resistance at the adhered portion is relatively improved.

Meanwhile, with the MFR of 300 g/10 min or less, the adhesion time through the dielectric heating can be reduced and stable adhesiveness can be obtained.

The MFR is thus more preferably in a range from 1 to 100 g/10 min, further preferably from 1 to 50 g/10 min.

It should be noted that the MFR can be measured in accordance with JIS K 7210-1 (2014) at 230 degrees C. under 2.16 kg load.

(2) A2 Component

Type

The type of the A2 component (second thermoplastic resin) as one of adhesive components is not limited as long as the solubility parameter of the A2 component is larger than the solubility parameter of the above-described A1 component.

Examples of the A2 component include a polyester resin (including a crystalline polyester, an amorphous polyester, and a mixture of the crystalline polyester and amorphous polyester), an olefin thermoplastic elastomer, a styrene thermoplastic elastomer, a polyamide resin, a polyvinyl acetate resin, a polyacetal resin, a polycarbonate resin, a polyacrylic resin, a polyamide resin, a polyimide resin, a polyvinyl acetate resin, and a phenoxy resin.

When a polyester resin is used as the A2 component, the polyester resin is more preferably a crystalline polyester resin.

This is because the crystalline polyester resin provides relatively good compatibility with the A1 component, allows easy adjustment of melting point or softening point and, consequently, can provide excellent mechanical strength and transparency and stable adhesiveness.

It should be noted that permittivity ($\varepsilon$/1 MHz) of the crystalline polyester resin is typically in a range from 2.8 to 4.1, dielectric power factor (tan $\delta$/1 MHz) of the crystalline polyester resin is in a range from 0.005 to 0.026, and loss factor of the crystalline polyester resin is approximately in a range from 0.0168 to 0.11.

Solubility Parameter

The solubility parameter ($\delta 2$) of the second thermoplastic resin may be any value larger than the solubility parameter ($\delta 1$) of the first thermoplastic resin.

The solubility parameter ($\delta 2$) of the second thermoplastic resin is preferably restricted so that a difference ($\delta 2 - \delta 1$) between the solubility parameter ($\delta 2$) of the second thermoplastic resin and the solubility parameter ($\delta 1$) of the first thermoplastic resin is 0.5 $(J/(cm^3))^{1/2}$ or more, more preferably so that the difference ($\delta 2 - \delta 1$) is in a range from 1 to 10 $(J/(cm^3))^{1/2}$, further preferably so that the difference ($\delta 2 - \delta 1$) is in a range from 2 to 8 $(J/(cm^3))^{1/2}$.

This is because, by controlling the solubility parameter ($\delta 2$) of the second thermoplastic resin in view of the difference ($\delta 2 - \delta 1$) in the solubility parameters, excellent adhesiveness can be obtained for adherends bonded through the dielectric welding film containing the thermoplastic resins, even when one of the adherends includes a low-polarity surface and the other of the adherends includes a high-polarity surface. In other words, reduction in adhesiveness to a surface of only one of the adherends (i.e. failure in obtaining a predetermined adhesivity) can be effectively prevented.

The solubility parameter ($\delta 2$) of the second thermoplastic resin is typically preferably in a range from 19.5 to 31.5 $(J/(cm^3))^{1/2}$.

This is because the solubility parameter ($\delta 2$) within the above predetermined range provides excellent compatibility and high adhesivity even when the adherend contains a high-polarity material.

More specifically, the solubility parameter ($\delta 2$) of 19.5 $(J/(cm^3))^{1/2}$ or more allows a sufficiently wide selection of the first thermoplastic resins usable in combination and can provide good adhesivity to a variety of adherends.

In contrast, when the solubility parameter ($\delta 2$) is 31.5 $(J/(cm^3))^{1/2}$ or less, the second thermoplastic resin is homogenized with the first thermoplastic resin, so that mechanical strength of resultant dielectric welding film is improvable and sufficient processability can be exhibited during the dielectric welding.

The solubility parameter ($\delta 2$) is more preferably in a range from 20 to 30 $(J/(cm^3))^{1/2}$, further preferably in a range from 20.5 to 28 $(J/(cm^3))^{1/2}$.

Melting Point or Softening Point

The melting point or softening point of the second thermoplastic resin is preferably in a range from 80 to 200 degrees C.

More specifically, the melting point (when the second thermoplastic resin is a crystalline resin) measured in accordance with JIS K 6863 (1994) or the softening point (when the second thermoplastic resin is an amorphous resin) measured in accordance with JIS K 6863 (1994) is preferably in a range from 80 to 200 degrees C.

This is because, when the melting point or the softening point of the second thermoplastic resin falls below 80 degrees C., the heat resistance may become so insufficient that the applicable range may be excessively limited and/or mechanical strength may be significantly reduced.

In contrast, when the melting point or the softening point of the second thermoplastic resin exceeds 200 degrees C., welding through the dielectric heating may take excessively long time and/or the adhesion strength may be excessively reduced.

Accordingly, the melting point or the softening point of the second thermoplastic resin, which may be a crystalline polyolefin resin, an amorphous polyolefin resin or a thermoplastic resin obtained by blending the crystalline and amorphous polyolefin resins, more preferably ranges from 100 to 190 degrees C., further preferably from 130 to 180 degrees C.

Average Molecular Weight

The average molecular weight (weight average molecular weight) of the second thermoplastic resin is usually preferably in a range from 5000 to 300000.

This is because, when the weight average molecular weight of the second thermoplastic resin falls below 5000, the heat resistance and/or the bonding strength may be significantly reduced.

In contrast, when the weight average molecular weight of the second thermoplastic resin exceeds 300000, the weldability and the like in the dielectric heating may be significantly reduced.

It should be noted that the weight average molecular weight of the second thermoplastic resin can be measured through, for instance, intrinsic viscosity method in accordance with JIS K 7367-3 (1999) in the same manner as the average molecular weight of the first thermoplastic resin.

Melt Flow Rate

The melt flow rate (MFR) of the second thermoplastic resin is usually preferably in a range from 1 to 300 g/10 min at 230 degrees C. under 2.16 kg load.

When the MFR is 1 g/10 min or more, the heat resistance at the adhered portion is relatively improved.

Meanwhile, with the MFR of 300 g/10 min or less, the adhesion time through the dielectric heating can be reduced and stable adhesiveness can be obtained.

It should be noted that the MFR of the second thermoplastic resin can be measured in accordance with JIS K 7210-1 (2014) at 230 degrees C. under 2.16 kg load in the same manner as the MFR of the first thermoplastic resin.

Blend Ratio

The blend ratio of the A2 component is preferably determined so that the blend ratio (A1 component:A2 component) in parts by mass is in a range from 5:95 to 95:5.

This is because, when the blend ratio of the A1 component is excessively small, blend effect of the A1 component is not readily exhibited to narrow the variety of types of applicable adherends, so that the welding film may not be applicable to a low-polarity adherend made of, for instance, a polypropylene resin.

In contrast, when the blend ratio of the A1 component is excessively large, blend effect of the A2 component is not readily exhibited to narrow the variety of types of applicable adherends, so that the welding film may not be applicable to a high-polarity adherend made of, for instance, an ABS resin.

The blend ratio of the A1 and A2 components (A1:A2) (in parts by mass) is thus more preferably in a range from 20:80 to 80:20, further preferably from 30:70 to 70:30.

(3) B1 Component

Type

The dielectric filler is a high-frequency wave absorbing filler having high dielectric loss factor enough to generate heat when a high-frequency wave of, for instance, 28 MHz or 40 MHz frequency is applied.

The dielectric filler is preferably a single one of or a combination of two or more of compounds selected from zinc oxide, silicon carbide (SiC), anatase-type titanium oxide, barium titanate, barium zirconate titanate, lead titanate, potassium niobate, rutile-type titanium oxide, hydrated aluminum silicate, inorganic substance having crystallization water such as hydrated aluminosilicate salt of alkali metal or alkaline earth metal, and the like.

Among the above, zinc oxide, which includes various types, provides a wide selection of shapes and sizes, and allows modification of welding and mechanical properties of the dielectric welding film depending on the intended use, is especially preferable as the dielectric filler.

The dielectric filler in a form of zinc oxide can be easily homogenized in the adhesive components (i.e. A1 and A2 components), so that excellent heat-generation effect can be exhibited during the predetermined dielectric heating in a relatively small content as compared with other dielectric fillers.

In other words, transparency of the dielectric welding film and heat-generating property (weldability) during the dielectric heating can be further favorably balanced.

Blend Ratio

The blend ratio of the B component is preferably in a range from 5 to 800 parts by mass with respect to 100 parts by mass of a total amount of the A1 and A2 components.

This is because, when the blend ratio of the B component becomes excessively small, heat-generating performance may become poor, so that the A component may be less likely to be melted, failing to provide strong adhesivity after the dielectric heating. In addition, at the blend ratio of the B component within the predetermined range, the A1 and A2 components, whose difference in solubility parameter is large, can be easily homogenized and stabilized when being blended to be dispersed, thereby improving mechanical property of the dielectric welding film.

In contrast, excessively large blend ratio of the B component may excessively lower fluidity of the dielectric welding film during the dielectric heating.

The blend ratio of the B component is thus preferably in a range from 30 to 600 parts by mass with respect to 100 parts by mass of the (A) component, more preferably in a range from 50 to 300 parts by mass.

Mean Particle Size

A mean particle size (median diameter: D50) of the B component measured in accordance with JIS Z 8819-2 (2001) is preferably in a range from 0.1 to 30 μm.

This is because, when the mean particle size is less than 0.1 μm, the filler is less polarized due to a reduced polarizable distance inside the filler, though depending on the type of the filler. Inversion motion caused when high-frequency wave is applied is thus attenuated to cause excessive decrease in the dielectric weldability, sometimes making it difficult to achieve tight adhesion between adherends.

Meanwhile, as the mean particle size increases, the filler is more polarized because of the increase in the polarizable distance inside the filler, so that the inversion motion caused when a high-frequency wave is applied is intensified, thereby improving the dielectric weldability.

However, when the mean particle size exceeds 30 μm, the distance between neighboring dielectric fillers becomes short and the inversion motion caused when a high-frequency wave is applied is attenuated due to electric charge of the neighboring dielectric fillers, so that the dielectric weldability may be excessively reduced and the adherends may be less tightly adhered.

The mean particle size of the B component is thus more preferably in a range from 1 to 30 μm, further preferably from 2 to 25 μm, most preferably from 3 to 20 μm.

(4) Additive

The dielectric welding film may be added with at least one of additives selected from tackifier, plasticizer, wax, coloring agent, antioxidant, ultraviolet absorber, antibacterial agent, coupling agent, viscosity modifier, organic or inorganic filler other than the dielectric filler, and a third thermoplastic resin (C1) different from the above-described first thermoplastic resin (A1) and the second thermoplastic resin (A2).

The tackifier and the plasticizer can improve melting and welding properties of the dielectric welding film. Examples of the tackifier include rosin derivative, polyterpene resin, aromatic modified terpene resin and hydrogenated products thereof, terpene phenol resin, coumarone.indene resin, aliphatic petroleum resin, and aromatic petroleum resin and hydrogenated products thereof.

Examples of the plasticizer include petroleum process oil such as paraffin process oil, naphthene process oil and aromatic process oil, natural oil such as castor oil and tall oil, and low-molecular-weight liquid polymer such as diacid dialkyl (e.g. dibutyl phthalate, dioctyl phthalate, and dibutyl adipate), liquid polybutene and liquid polyisoprene.

Examples of the third thermoplastic resin (C1) include one of or a combination of two or more of ethylene vinyl acetate copolymer resin, ethylene (meth)acrylate resin, ionomer resin, polyethylene chloride resin, and maleic modified polypropylene resin.

The blend ratio of the additive is typically preferably in a range from 0.1 to 20 mass % of a total amount of the dielectric welding film, more preferably in a range from 1 to 10 mass %, further preferably in a range from 2 to 5 mass %.

When blended as one of the additives, the third thermoplastic resin (C1), which is different from the first thermoplastic resin (A1) and the second thermoplastic resin (A2), can assist homogenization of the first and second thermoplastic resins, and allows adjustment of mechanical property to a desired value while maintaining the adhesiveness of the dielectric welding film.

It should be noted that preferable content of the third thermoplastic resin (C1) in the dielectric welding film is the same the above blend ratio as the additive, which is smaller than the content of each of the first thermoplastic resin (A1) and the second thermoplastic resin (A2).

The third thermoplastic resin (C1) has small impact on the adhesion property of the dielectric welding film at a content as small as an additive.

The solubility parameter of the third thermoplastic resin (C1) may be any value. In other words, the third thermoplastic resin (C1) may be a low-polarity resin or a high-polarity resin.

In the dielectric welding film of the first exemplary embodiment, the thermoplastic resin of the largest blend ratio is one of the first thermoplastic resin and the second thermoplastic resin and the thermoplastic resin of the second largest blend ratio is the other of the first thermoplastic resin and the second thermoplastic resin. The thermoplastic resin of the third (or more) largest blend ratio is the third thermoplastic resin.

By thus changing the ratios of the thermoplastic resins, the resin used as the first or the second thermoplastic resin can be defined as the third thermoplastic resin, and, conversely, the third thermoplastic resin can be defined as the first or the second thermoplastic resin.

2 Properties of Dielectric Welding Film (1) Thickness

The thickness of the dielectric welding film is typically preferably in a range from 10 to 2000 μm.

This is because, when the thickness of the dielectric welding film is 10 μm, the adhesivity between the adherends sometimes rapidly decreases.

In contrast, when the thickness of the dielectric welding film exceeds 2000 μm, it is sometimes difficult to wind the dielectric welding film as a long object into a roll and to apply the dielectric welding film to a roll-to-roll process.

Accordingly, the thickness of the dielectric welding film is typically more preferably in a range from 100 to 1000 μm, further preferably in a range from 200 to 600 μm, though depending on the usage of the dielectric welding film and the like.

(2) Dielectric Property (tan δ/ε')

The dissipation factor (tan δ) and permittivity (ε') as the dielectric properties of the dielectric welding film, which may be measured in accordance with JIS C 2138:2007, can be easily and accurately measured in accordance with impedance material method.

The dielectric property (tan δ/ε'), which is obtained by dividing dissipation factor (tan δ) measured with an impedance material analyzer or the like by permittivity (ε') measured in the same manner, is preferably 0.005 or more.

This is because, when the dielectric property is less than 0.005, the dielectric welding film does not generate heat as desired through the dielectric heating irrespective of the type of the adhesive component and the like, sometimes making it difficult to tightly adhere the adherends.

However, when the value of the dielectric property is excessively large, it sometimes occurs that the types of usable adhesive component and dielectric filler are excessively limited and/or total light transmissivity is rapidly decreased.

Accordingly, the dielectric property of the dielectric welding film is more preferably in a range from 0.008 to 0.05, further preferably in a range from 0.01 to 0.03.

It should be noted that the measurement method of the dielectric property of the dielectric welding film will be detailed below in later-described Example 1.

(3) Total Light Transmissivity

Total light transmissivity of the dielectric welding film is preferably 1% or more.

This is because, when the total light transmissivity (%) is less than 1%, it may become virtually difficult to locate the dielectric welding film (of an excessive thickness) at a predetermined point through visual check.

Though the upper limit of the total light transmissivity of the dielectric welding film is not limited, excessively large total light transmissivity may excessively limit the types of the usable A1 component, A2 component, and B component.

Accordingly, the total light transmissivity of the dielectric welding film is more preferably in a range from 5 to 99%, further preferably in a range from 10 to 95%.

It should be noted that the total light transmissivity is found to be usually approximately 50% when a mixture of the A component and B component at a predetermined ratio is blended with the dielectric filler in a predetermined respective amounts (e.g. at a suitable blend ratio of approximately 100 parts by weight:156 parts by weight).

It should be noted that the measurement method of the total light transmissivity (%) of the dielectric welding film will be detailed below in later-described Example 1.

(4) Viscoelastic Property

With regard to viscoelastic property (dynamic elastic modulus) of the dielectric welding film, it is preferable that storage modulus (E') measured at 10 Hz frequency with a viscoelastometer or the like is in a range from $1 \times 10^6$ to $1 \times 10^{10}$ Pa both at a room temperature and at 80 degrees C.

This is because, when the storage modulus is less than $1 \times 10^6$ Pa at a room temperature or at 80 degrees C., the surface of the dielectric welding film may become tacky to cause blocking, which makes it difficult to store the dielectric welding film in a roll.

In contrast, when the storage modulus exceeds $1 \times 10^{10}$ Pa at a room temperature or at 80 degrees C., the dielectric welding film may become brittle to make it difficult to unroll the dielectric welding film or adhere the dielectric welding film on an adherend while applying a high tension.

The measurement method of the storage modulus of the dielectric welding film will be detailed below in later-described Example 1.

Second Exemplary Embodiment

In a second exemplary embodiment, an welding method using a dielectric welding film for welding adherends of the same material or different materials though dielectric heating will be described.

The dielectric welding film includes the first thermoplastic resin having the predetermined solubility parameter ($\delta 1$) as the A1 component, the second thermoplastic resin having the solubility parameter ($\delta 2$) larger than the first thermoplastic resin as the A2 component, and the dielectric filler as the B component. The welding method includes the following sequentially performed steps (1) and (2):
(1) holding the dielectric welding film between a pair of adherends; and
(2) applying dielectric heating on the dielectric welding film held between the pair of adherends with a dielectric heater at a high-frequency output ranging from 0.1 to 20 kW and a high-frequency wave application time of 1 second or more and less than 40 seconds.

The welding method of the dielectric welding film according to the second exemplary embodiment will be described below mainly on features different from those in the first exemplary embodiment.

1. Step (1)

In the step (1), the dielectric welding film is disposed at a predetermined position, where the dielectric welding film is held between the plurality of adherends of the same material or different materials.

At this time, it is usually preferable to hold the dielectric welding film between the plurality of adherends after the dielectric welding film is cut into pieces of a predetermined shape.

Moreover, it is also preferable, in order to locate the dielectric welding film at a correct position without position gap, to provide a sticky portion all over or on a part of one side or both sides of the dielectric welding film, and/or to provide a temporary fixing hole or projection on a part of the dielectric welding film.

The material(s) usable for the adherends is not limited but may be any one of an organic material, an inorganic material (including metal material) or a composite of the organic and inorganic materials.

Examples of the organic material include a plastic material such as polypropylene resin, polyethylene resin, acrylonitrile-butadiene-styrene copolymer resin (ABS resin), polycarbonate resin (PC resin), polyamide resin (e.g. Nylon 6, Nylon 66), polybutylene terephthalate resin (PBT resin), polyacetal resin (POM resin), polymethyl methacrylate resin and polystyrene resin, and a rubber material such as styrene-butadiene rubber (SBR), ethylene propylene rubber (EPR) and silicone rubber.

Examples of the inorganic material include glass material, ceramic material and metal material. A fiber-reinforced resin (FRP), which is a composite of glass fiber and the above plastic material, is also preferable as the inorganic material.

Especially, polypropylene and polyethylene, which are hard to bond due to the low-polarity of the surface thereof, can be tightly adhered by the dielectric welding method of the second exemplary embodiment, and thus are preferable as a material(s) of the adherends.

The dielectric welding method of the second exemplary embodiment uses a single dielectric welding film to weld the hard-to-bond adherend and an adherend (e.g. ABS resin and PC resin) having a high-polarity surface, and thus is widely applicable.

2. Step (2)

In the step (2), dielectric heating is applied on the dielectric welding film held between the plurality of adherends with a dielectric welding machine as shown in FIG. 1, for instance, at a high-frequency output ranging from 0.1 to 20 kW and a high-frequency wave application time of 1 second or more and less than 40 seconds.

The dielectric welding machine used in the step (2) and dielectric heating conditions thereof will be described below.

(1) Dielectric Welding Machine

As shown in FIG. 1, a dielectric welding machine 10 performs dielectric heating through a dielectric welding film 13 held between a first adherend 12 and a second adherend 14 and applies pressure by a first high-frequency electrode 16 and a second high-frequency electrode 18 to adhere the first adherend 12 and the second adherend 14.

The dielectric welding machine 10 includes a high-frequency power source 20 configured to apply a high-frequency wave of approximately 28 MHz or 40 MHz frequency to each of the oppositely disposed first high-frequency electrode 16 and second high-frequency electrode 18.

When a high-frequency electric field is created between the electrodes 16, 18, high-frequency wave energy is absorbed by the dielectric filler (not shown) uniformly dispersed in the adhesive component in the dielectric welding film 13 at a part at which the first adherend 12 and the second adherend 14 are overlapped.

The dielectric filler serves as a heat source, the heat generated by the dielectric filler melting the first and second thermoplastic resin components in the dielectric welding film 13, thereby tightly adhering the first adherend 12 and the second adherend 14 within a short time.

Subsequently, compression force is applied by the first high-frequency electrode 16 and the second high-frequency electrode 18 serving also as a press machine as shown in FIG. 5. The melting of the dielectric welding film 13 in combination with the compression force applied by the electrodes 16 and 18 achieves tight adhesion of the first adherend 12 and the second adherend 14.

(2) Dielectric Heating Conditions

Though the dielectric welding conditions can be altered as desired, the high-frequency output is usually preferably in a range from 0.1 to 20 kW, more preferably in a range from 0.2 to 10 kW, further preferably in a range from 0.2 to 5 kW.

The application time of the high-frequency wave is preferably 1 second or more and less than 40 seconds, more preferably in a range from 5 to 30 seconds, further preferably in a range from 10 to 20 seconds.

The frequency of the high-frequency wave is preferably in a range from 1 to 100 MHz, more preferably in a range from 5 to 80 MHz, further preferably in a range from 10 to 50 MHz. Specifically, 13.56 MHz, 27.12 MHz, and 40.68 MHz of ISM band allocated by the International Telecommunication Union are used in the dielectric welding method according to the second exemplary embodiment.

EXAMPLES

Example 1

1. Preparation of Dielectric Welding Film 50 parts by mass of random polypropylene resin as the A1 component (Prime Polypro F-744NP manufactured by Prime Polymer Co., Ltd., solubility parameter ($\delta 1$): 16.4 $(J/(cm^3))^{1/2}$, melting point: 130 degrees C., MFR: 7 g/10 min, referred to as A1-1 in Table 1) were weighed and put into a vessel.

It should be noted that the melting point of the A1 component was determinable with, for instance, a commercially available differential scanning calorimeter Q2000 (manufactured by TA Instruments) from a peak position of a DSC chart obtained by: heating 10 mg of the A1 component (measurement sample) to 250 degrees C.; cooling the measurement sample to 25 degrees C. at a temperature decrease rate of 10 degrees C./min; and scanning the measurement sample under predetermined conditions (temperature-increase rate: 10 degrees C./min).

Then, 50 parts by mass of crystalline polyester resin as the A2 component (Vylon GM-915 manufactured by TOYOBO CO., LTD., solubility parameter ($\delta 2$): 20.9 $(J/(cm^3))^{1/2}$, melting point: 139 degrees C., weight average molecular weight: 45000, referred to as A2-1 in Table 1) were weighed and put into the vessel.

Further, 156 parts by mass of zinc oxide as the B component (LPZINC11 manufactured by Sakai Chemical Industry Co., Ltd., mean particle size: 11 μm, specific weight: 5.6, referred to as B-1 in Table 1) was weighed and put into the vessel.

Subsequently, as shown in Table 1, the A1 component. A2 component and B component were preliminarily blended in the vessel and then were fed into a hopper of a biaxial extruder of 30 mm diameter, where the components were melted and kneaded at a cylinder set temperature ranging from 180 to 200 degrees C. and a die temperature of 200 degrees C. to obtain granular pellets.

Then, the obtained granular pellets were put into a hopper of a uniaxial extruder provided with a T-die, and a 400-μm thick film-shaped molten kneaded product was extruded from the T-die at a cylinder temperature of 200 degrees C. and a die temperature of 200 degrees C., and cooled to a room temperature to obtain the dielectric welding film of Example 1.

Figure 2A:
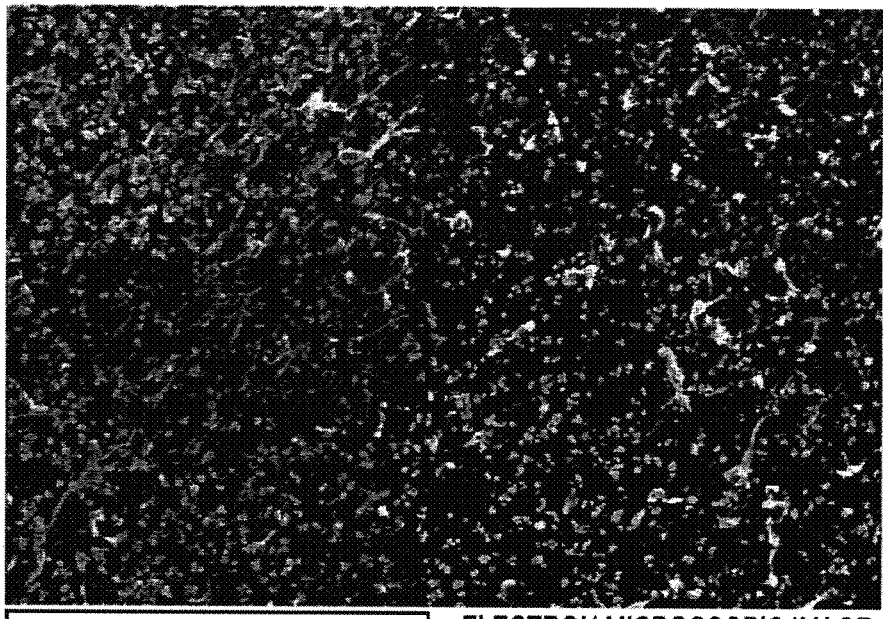
FIG. 2A shows a surface of the dielectric welding film according to an exemplary embodiment of the invention (photograph, 150× magnification).
Figure 2B:
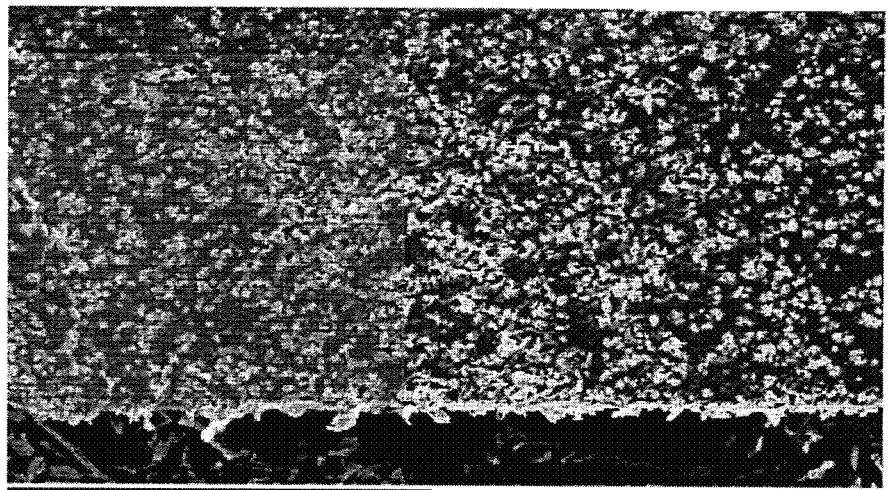
FIG. 2B shows a cross section of the dielectric welding film according to an exemplary embodiment of the invention (photograph, 150× magnification).

A surface of the dielectric welding film and a cross section of the dielectric welding film are shown in photographs (150× magnification) in FIGS. 2A and 2B, respectively.

2 Evaluation of Dielectric Welding Film (1) Average Thickness

Thicknesses of the dielectric welding film cut into a predetermined size were measured at 10 spots with a micrometer and an average of the thicknesses was calculated to obtain an average thickness (sometimes simply referred to as "thickness" hereinafter) of the dielectric welding film.

(2) Total Light Transmissivity

The total light transmissivity of the welding film cut into the predetermined size was measured in accordance with JIS K 7361-1 (1997) with a haze meter NDH5000 manufactured by NIPPON DENSHOKU INDUSTRIES CO., LTD. under Illuminant D65.

(3) Dielectric Property (tan $\delta/\varepsilon'$)

With an impedance material analyzer E4991 (manufactured by Agilent Technologies, Inc.), the permittivity ($\varepsilon'$) and dissipation factor (tan $\delta$) of the welding film cut into the predetermined size were measured at 23 degrees C. and 40 MHz frequency to calculate the value of the dielectric property (tan $\delta/C$).

(4) High-Frequency Weldability

A dielectric welding film (welding film) cut into a 25 cm×12.5 cm piece was held between a glass-reinforced polypropylene plate (25 cm×10 cm×1.5 mm) as the first adherend and an ABS plate (25 cm×10 cm×1.5 mm) as the second adherend.

Subsequently, while the plates were held between electrodes of a high-frequency dielectric heater (YRP-400T-A manufactured by YAMAMOTO VINITA CO., LTD), a high-frequency wave of 40 MHz frequency and 200 W output was applied for a predetermined time to prepare a test piece (i.e. adherends welded through the welding film).

High-frequency weldability of the obtained test piece after the high-frequency wave was applied was evaluated in accordance with the criteria below.

⊚: The adherends were welded through the welding film by applying the high-frequency wave for less than 10 seconds.

○: The adherends were welded through the welding film by applying the high-frequency wave for a time period of 10 seconds or more and less than 40 seconds.

Δ: The adherends were welded through the welding film by applying the high-frequency wave for a time period of 40 seconds or more and less than 60 seconds.

x: The adherends were not welded through the welding film even after applying the high-frequency wave for 60 seconds.

(5) Adhesivity (Tensile Shear Force)

With a universal tensile tester (Instron 5581 manufactured by Instron Corporation), a tensile shear force of the test piece obtained in the evaluation in "(4) High-Frequency Weldability" was measured as adhesivity at a tension rate of 100 mm/min, and was observed in terms of destroy mode to evaluate the adhesivity in accordance with the criteria below.

⊚: Material failure or cohesive failure occurred and the tensile shear strength was 5 MPa or more.

○: Material failure or cohesive failure occurred and the tensile shear strength was 1 MPa or more and less than 5 MPa.

Δ: Interfacial peeling occurred and the tensile shear strength was less than 1 MPa.

x: The test piece was not welded or the adherends temporarily welded could not be kept until the test, so that the tensile shear test was not available.

Example 2

The composition in Example 2 included: 45 parts by mass of the random polypropylene resin (A1-1) used in Example 1 as the A1 component; 5 parts by mass of olefin thermoplastic elastomer as the C1 component (ESPOLEX TPE-4675, manufactured by Sumitomo Chemical Co., Ltd, solubility parameter: 16.4 $(J/(cm^3))^{1/2}$, melting point: 160 degrees C., referred to as C1-1 in Table 1); and 5 parts by mass of maleic anhydride modified polypropylene as an additional C1 component (UMEX 1001, manufactured by Sanyo Chemical Industries, Ltd., solubility parameter: 18.0 $(J/(cm^3))^{1/2}$, melting point: 142 degrees C., referred to as C1-2 in Table 1).

The composition of Example 2 further included 45 parts by mass of the crystalline polyester resin (A2-1) used in Example 1 as the A2 component, and 156 parts by mass of zinc oxide (LPZINC2 manufactured by Sakai Chemical Industry Co., Ltd., mean particle size: 2 μm, specific weight: 5.6, referred to as B-2 in Table 1). A dielectric welding film of Example 2 was prepared and evaluated in the same manner as that of Example 1 other than the above.

Example 3

A dielectric welding film of Example 3 was prepared and evaluated in the same manner as that of Example 1 except that: 70 parts by mass of the random polypropylene resin (A1-1) used in Example 1 was used as the A1 component, and 30 parts by mass of crystalline polyester resin (Vylon GM-920 manufactured by TOYOBO CO., LTD., melting point: 107 degrees C., weight average molecular weight: 30000, referred to as A2-2 in Table 1) was used as the A2 component.

Example 4

A dielectric welding film of Example 4 was prepared and evaluated in the same manner as that of Example 1 except that: 30 parts by mass of the random polypropylene resin (A1-1) used in Example 1 was used as the A1 component, 70 parts by mass of the crystalline polyester resin (A2-1) used in Example 1 was used as the A2 component, and 156 parts by mass of silicon carbide (GMF15 manufactured by Pacific Rundum Co., Ltd., mean particle size: 0.5 µm, specific weight: 5.6, referred to as B-3 in Table 1) was used as the B component.

Example 5

A dielectric welding film of Example 5 was evaluated in the same manner as that of Example 1 except that, though the same dielectric welding film as in Example 1 was prepared, a PC plate (25 cm×10 cm×1.5 mm) was used as the second adherend in place of the ABS plate in evaluating the high-frequency weldability.

Example 6

A dielectric welding film of Example 6 was evaluated in the same manner as that of Example 1 except that, though the same dielectric welding film as that of Example 1 was prepared, a PBT plate (25 cm×10 cm×1.5 mm) was used as the second adherend in place of the ABS plate in evaluating the high-frequency weldability.

Example 7

A dielectric welding film of Example 7 was prepared and evaluated in the same manner as that of Example 1 except that: 70 parts by mass of random polypropylene (A1-1) used in Example 1 was used as the A1 component, and 30 parts by mass of maleic anhydride modified polypropylene (C1-2) used in Example 2 was used as the A2 component (referred to as A2-3 in Table).

Comparative 1

A dielectric welding film of Comparative 1 was prepared and evaluated in the same manner as that of Example 1 except that: 100 parts by mass of the random polypropylene (A1-1) used in Example 1 was used as the A1 component and no A2 component was blended.

Comparative 2

A dielectric welding film of Comparative 2 was prepared and evaluated in the same manner as that of Example 1 except that: 100 parts by mass of the random polypropylene (A1-1) used in Example 1 was used as the A1 component and A2 component and B component were not blended.

TABLE 1

| | | | Examples | | | | | | | Comparatives | |
|---|---|---|---|---|---|---|---|---|---|---|---|
| | | | 1 | 2 | 3 | 4 | 5 | 6 | 7 | 1 | 2 |
| Resin Composition | (A) Thermoplastic resin | Random polypropylene | 50 (A1-1) | 45 (A1-1) | 70 (A1-1) | 30 (A1-1) | 50 (A1-1) | 50 (A1-1) | 70 (A1-1) | 100 (A1-1) | 100 (A1-1) |
| | | Crystalline polyester resin | 50 (A2-1) | 45 (A2-1) | 30 (A2-2) | 70 (A2-1) | 50 (A2-1) | 50 (A2-1) | | | |
| | | Maleic anhydride modified polyproplylene | | | | | | | 30 (A2-3) | | |
| | (B) Dielectric filler | 11-µm zinc oxide (B-1) | 156 | | 156 | | 156 | 156 | 156 | 156 | |
| | | 2-µm zinc oxide (B-2) | | | | | | | | | |
| | | 0.5-µm zinc oxide (B-3) | | | | 156 | | | | | |
| | (C) Additive | Olefin thermoplastic elastomer | | 5 (C1-1) | | | | | | | |
| | | Maleic anhydride modified polyproplylene | | 5 (C1-2) | | | | | | | |
| Property/evaluation results of welding film | | (1) Thickness (µm) | 400 | 400 | 400 | 400 | 400 | 400 | 400 | 400 | 400 |
| | | (2) Dielectric property | 0.015 | 0.012 | 0.01 | 0.016 | 0.015 | 0.015 | 0.015 | 0.016 | 0.001 |
| | | (3) Total light transmissivity (%) | 20 | 11 | 19 | 23 | 20 | 20 | 20 | 24 | 87 |
| | | (4) High-frequency weldability | ◎ | ◎ | ○ | ◎ | ◎ | ◎ | ◎ | ◎ | X |
| | | (5) Shear force (peeing mode) | ◎ (cohesive) | ◎ (cohesive) | ◎ (cohesive) | ○ (cohesive) | ○ (interfacial) | ◎ (cohesive) | Δ (interfacial) | ○ (interfacial) | X |

INDUSTRIAL APPLICABILITY

The dielectric welding film of the invention, which includes at least two types of thermoplastic resins (the first thermoplastic resin and the second thermoplastic resin) with different solubility parameters as the A1 component and the A2 component and the dielectric filler as the B component, can exhibit strong adhesivity to a variety of adherends in a short period of dielectric heating (e.g. less than 40 seconds).

A predetermined transparency (total light transmissivity) can also be ensured by the dielectric welding film of the invention. Accordingly, the dielectric welding film can be placed onto a desired portion on a surface of an adherend without using a predetermined positioning member.

According to the welding method with the use of the dielectric welding film of the invention, only a predetermined position can be locally heated with a dielectric heater from an outside. Thus, the welding method is very effective in adhering adherends with a large-sized and complicated three-dimensional structure, a thick complicated three-dimensional structure, or the like required to have a high dimensional accuracy.

The dielectric welding film of the invention exhibits excellent adhesiveness to polyolefin-resin adherends, and is applicable to various adherends made of a high-performance thermoplastic resin composite, such as fiber-reinforced plastics (FRP), ABS resin and PC resin, which is expected to be increasingly widely used in the time to come.

Accordingly, the invention is expected to be used as a bonding technology for bonding fiber-reinforced plastics (FRP) in the fields of airplane and automobile whose weight is increasingly reduced, and for bonding components of electronics and medical equipment whose size is increasingly reduced and structure is increasingly complicated.

Further, the dielectric welding film or the like of the invention is appropriately controllable in terms of the thickness and storage modulus and the like of the welding film, and thus is applicable to a roll-to-roll process. Further, the dielectric welding film or the like can be designed into any size and shape by punching or the like in accordance with the adhesion area and shape between the plurality of adherends, providing great advantage in the production process.

The invention claimed is:

1. A dielectric welding film configured to weld a pair of adherends of the same material or different materials through dielectric heating, the dielectric welding film comprising:
    a first thermoplastic resin as an A1 component having a predetermined first solubility parameter ($\delta 1$);
    a second thermoplastic resin as an A2 component, the second thermoplastic resin having a second solubility parameter ($\delta 2$) larger than the first solubility parameter of the first thermoplastic resin; and
    a dielectric filler as a B component,
    wherein the A1 component and the A2 component are directly mixed with each other as adhesive components,
    the A1 component is a polyolefin resin and the A2 component is a polyester resin or maleic anhydride modified polypropylene,
    the B component is at least one compound selected from the group consisting of zinc oxide and silicon carbide, and
    a content of the B component is in a range from 50 to 600 parts by mass with respect to 100 parts by mass of a total amount of the A1 component and the A2 component.

2. The dielectric welding film according to claim 1, wherein
    a difference ($\delta 2-\delta 1$) between the second solubility parameter ($\delta 2$) of the A2 component and the first solubility parameter ($\delta 1$) of the A1 component is 0.5 $(J/(cm^3))^{1/2}$ or more.

3. The dielectric welding film according to claim 1, wherein
    the first solubility parameter ($\delta 1$) of the A1 component is 12 $(J/(cm^3))^{1/2}$ or more and less than 19.5 $(J/(cm^3))^{1/2}$, and
    the second solubility parameter ($\delta 2$) of the A2 component is in a range from 19.5 $(J/(cm^3))^{1/2}$ to 31.5 $(J/(cm^3))^{1/2}$.

4. The dielectric welding film according to claim 1, wherein the A1 component is a polyolefin resin and the A2 component is a polyester resin.

5. The dielectric welding film according to claim 1, wherein a blend ratio of the A1 component and the A2 component in parts by mass is in a range from 5:95 to 95:5.

6. The dielectric welding film according to claim 1, wherein the B component is zinc oxide.

7. The dielectric welding film according to claim 1, wherein a mean particle size of the B component measured in accordance with JIS Z 8819-2 (2001) is in a range from 1 to 30 μm.

8. A welding method using a dielectric welding film configured to weld a pair of adherends of the same material or different materials through dielectric heating, comprising steps (1) and (2) of:
    (1) holding the dielectric welding film between the pair of adherends; and
    (2) applying the dielectric heating on the dielectric welding film held between the pair of adherends with a dielectric heater by applying a high-frequency wave of 1 to 100 MHz frequency,
    wherein the dielectric welding film comprising a first thermoplastic resin as an A1 component having a predetermined first solubility parameter ($\delta 1$), a second thermoplastic resin as an A2 component having a second solubility parameter ($\delta 2$) larger than the first solubility parameter of the first thermoplastic resin, and a dielectric filler as a B component, and
    wherein a content of the B component is in a range from 50 to 600 parts by mass with respect to 100 parts by mass of a total amount of the A1 component and the A2 component, the A1 component and the A2 component are directly mixed with each other as adhesive components, the A1 component is a polyolefin resin and the A2 component is a polyester resin or maleic anhydride modified polypropylene, and the B component is at least one compound selected from the group consisting of zinc oxide and silicon carbide.

9. The welding method according to claim 8, wherein, in the step (2), the high-frequency wave is applied at a high-frequency output ranging from 0.1 to 20 kW for a high-frequency wave application time of 1 second or more and less than 40 seconds.

10. The welding method according to claim 8, wherein, a mean particle size of the B component measured in accordance with JIS Z 8819-2 (2001) is in a range from 1 to 30 μm.

11. The dielectric welding film according to claim 1, wherein the A1 component is a non-modified polyolefin resin, and
    the polyolefin resin as the A1 component is a homopolymer resin comprising polyethylene, polypropylene, polybutene or polymethylpentene, or an α-olefin resin comprising a copolymer of ethylene, propylene, butene, hexene, octene, or 4-methylpentene.

12. The welding method according to claim 8, wherein the A1 component is a non-modified polyolefin resin, and
the polyolefin resin as the A1 component is a homopolymer resin comprising polyethylene, polypropylene, polybutene or polymethylpentene, or an α-olefin resin comprising a copolymer of ethylene, propylene, butene, hexene, octene, or 4-methylpentene.

13. The dielectric welding film according to claim 1, wherein a blend ratio of the A1 component and the A2 component in parts by mass is in a range from 20:80 to 95:5.

14. The welding method according to claim 8, wherein a blend ratio of the A1 component and the A2 component in parts by mass is in a range from 20:80 to 95:5.

* * * * *